UNITED STATES PATENT OFFICE.

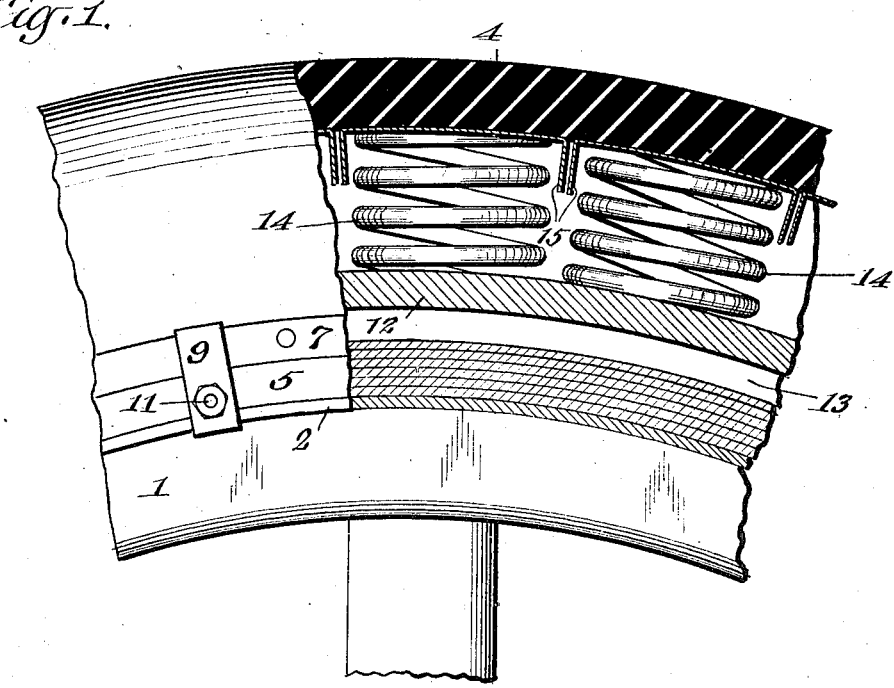
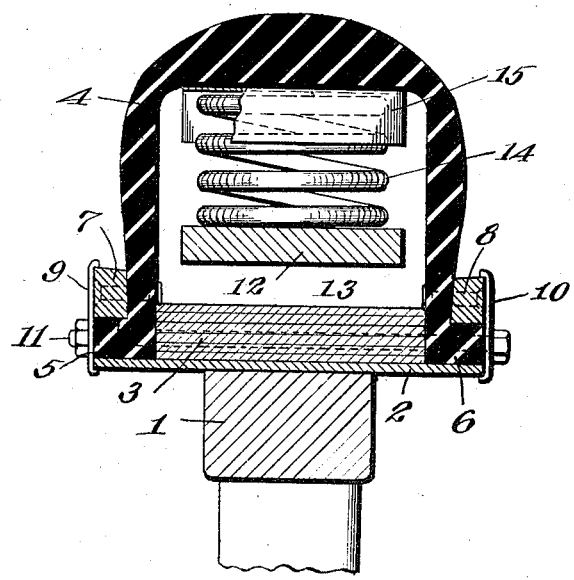

ADONIRAM J. WILSON, OF WESTFIELD, NEW JERSEY.

VEHICLE-TIRE.

975,816.  Specification of Letters Patent.  Patented Nov. 15, 1910.

Application filed December 15, 1909. Serial No. 533,10

*To all whom it may concern:*

Be it known that I, ADONIRAM J. WILSON, a citizen of the United States, and a resident of Westfield, county of Union, and State of New Jersey, have invented certain new and useful Improvements in Vehicle - Tires, of which the following is a specification.

This invention relates to wheel tires such as are designed for use on vehicle wheels.
The invention seeks to provide an efficient, durable structure, which will obviate the necessity of employing pneumatic tubes or chambers and wherein the required resilience of the tire shall be provided by a novel arrangement of mechanical means.

In the accompanying drawings forming part of this specification, and in which like reference numerals designate corresponding parts, Figure 1 is a peripheral portion of the tire in the preferred form, the same being partly in longitudinal section and attached to a wheel-rim. Fig. 2 is a transverse sectional elevation through the structure shown in Fig. 1.

Referring now more particularly to the parts as shown in the drawings, 1 is the felly of a wheel.

2 is the wheel rim attached to the felly in any suitable way as by shrinking the same thereon.

3 is a filler closely surrounding the rim and constituting a part thereof. This filler may consist of any material but is preferably composed, as shown, of layers of canvas and rubber vulcanized together.

4 is the shoe. It is provided with flanges 5 and 6:

7 and 8 are stiffening rings surrounding the flanges 5 and 6 and riveted to the sides of the shoe. The shoe closely surrounds the rim 2 and so that its sides abut the edges of the filler 3.

9 and 10 are plates located at various points around the shoe and operating to hold the shoe in place on the rim 2. For this purpose the ends of the plates 9 and 10 overlap the outer edges of the rings 7 and 8 and the edges of the rim 2, the plates on the opposite sides of the shoe being bound together by bolts 11 which bind the sides of the shoe against the edges of the filler 3. The filler serves as a backing for the sides of the shoe when the nuts on the bolts are screwed up tight and also serves to prevent the entrance
of dust and moisture. The means for attaching the shoe to the rim and the construction of the rim itself may be variously modified and the filler may be omitted if desired.

12 is a stiff, floating ring surrounding the rim and filler. Its inner diameter is larger than the outer diameter of the rim or the rim and filler so as to leave an open or clearance space 13 next to and within the inner periphery of the ring 12. Spring means normally under tension are located between the outer periphery of the shoe and the ring 12. It is important that these spring means be put normally under tension in order that the tire may be sufficiently hard to properly sustain the weight carried by the wheel. If such normal tension were not initially imparted to the spring means, the weight on the wheel would unduly flatten the tire at its point of contact with the ground, the spring means would yield too readily to light stresses, and under a heavier stress would be likely to reach the limit of their capacity with a shock. In the preferred form these spring means are arranged radially around the floating ring and in the best form consist of coiled springs 14 as shown in the drawings. It will be seen that such spring means are unattached, being free to creep circumferentially with reference to the wheel center when the tire is in active use.

15 are cups interposed between the ends of the springs and the surface against which the springs bear. They serve to protect this bearing surface from wearing and also to keep the springs separated. In the present instance, they are shown interposed between the ends of the springs and the inner surface of the shoe.

When the tire is in active use, the floating ring operates to distribute the strain upon the springs nearest the ground to the springs above the wheel center. In this action of the floating ring upon the springs above the wheel center, the springs are reliably and securely held in proper position by the shoe which is mechanically secured to the wheel rim by means of the plates 9 and 10 which engage the rings 7 and 8 of the shoe and the edges of the rim.

In assembling the parts, the shoe may be laid on its side, the coiled springs and cups put in place and then the floating ring, having been split to enable it to be contracted, may be put in place and its ends fastened together as by welding, riveting or otherwise to form a solid ring.

What is claimed and what is desired to be secured by Letters Patent is:—

1. In a wheel-tire, the combination of a shoe having provision for mechanically securing it to a wheel rim; a floating ring within the shoe adapted and designed to surround said rim and so as to leave an open or clearance space between said ring and rim; and a plurality of springs normally under radial tension located between said ring and shoe, and arranged to yield radially to compression.

2. In a wheel-tire, the combination of a shoe secured to a rim; a floating ring within the shoe adapted and designed to surround said rim and so as to leave an open or clearance space between said ring and rim; and a series of radially disposed spring means normally under tension located between said ring and shoe.

3. In a wheel-tire, the combination of a shoe secured to a rim; a floating ring within the shoe adapted and designed to surround said rim and so as to leave an open or clearance space between said ring and rim; and a series of radially disposed coil springs located between said ring and shoe.

4. In a wheel-tire, the combination of a shoe having provision for mechanically securing it to a wheel rim; a floating ring within the shoe adapted and designed to surround said rim and so as to leave an open or clearance space between said ring and rim; and a plurality of unattached spring means normally under radial tension located between said ring and shoe, and arranged to yield radially to compression.

5. In a wheel-tire, the combination of a shoe secured to a rim; a floating ring within the shoe adapted and designed to surround said rim and so as to leave an open or clearance space between said ring and rim; and a series of separate unattached radially disposed springs normally under tension located between said ring and shoe.

6. In a wheel-tire, the combination of a shoe secured to a rim; a floating ring within the shoe adapted and designed to surround said rim and so as to leave an open or clearance space between said ring and rim; and a series of unattached radially disposed coiled springs located between said ring and shoe.

7. In a wheel-tire, the combination of a shoe having provision for mechanically securing it to a wheel tire; a floating ring within the shoe adapted and designed to surround said rim and so as to leave an open or clearance space between said ring and rim; a plurality of spring means normally under radial tension located between said ring and shoe, and arranged to yield radially to compression; and cups to receive the ends of said spring means.

8. In a wheel-tire, the combination of a shoe secured to a rim; a floating ring within the shoe adapted and designed to surround said rim and so as to leave an open or clearance space between said ring and rim; a series of unattached radially disposed coiled springs normally under tension located between said ring and shoe; and cups to receive the outer ends of said springs.

In testimony whereof, I have signed my name to this specification, in the presence of two subscribing witnesses.

ADONIRAM J. WILSON.

Witnesses:
BEATRICE MIRVIS,
IDA G. GILMORE.